United States Patent
Cassette

(10) Patent No.: US 7,070,473 B1
(45) Date of Patent: Jul. 4, 2006

(54) ADJUSTABLE-TONE DEER CALL HAVING A METAL SLIDER

(76) Inventor: Angelo Cassette, 16 Mohawk Dr., Greensburg, PA (US) 15601-4718

( * ) Notice: Subject to any disclaimer, the term of this patent is extended or adjusted under 35 U.S.C. 154(b) by 163 days.

(21) Appl. No.: 10/781,172

(22) Filed: Feb. 17, 2004

Related U.S. Application Data

(60) Provisional application No. 60/447,425, filed on Feb. 14, 2003.

(51) Int. Cl.
*A63H 5/00* (2006.01)
*G10B 3/00* (2006.01)

(52) U.S. Cl. .......................... 446/207; 446/208; 84/363

(58) Field of Classification Search ................ 446/200, 446/202, 203, 207, 208, 209; 84/363, 364, 84/383 A, 383 R
See application file for complete search history.

(56) References Cited

U.S. PATENT DOCUMENTS

| | | | | |
|---|---|---|---|---|
| 3,928,935 A | * | 12/1975 | Beadles, Jr. | ................ 446/208 |
| 4,221,075 A | | 9/1980 | Gallagher | |
| 4,335,539 A | * | 6/1982 | Jones | .......................... 446/204 |
| 4,888,903 A | * | 12/1989 | Knight et al. | ..................... 43/1 |
| 4,915,660 A | | 4/1990 | Overholt, Sr. | |
| 4,940,451 A | | 7/1990 | Leady | |
| 5,222,903 A | | 6/1993 | Parrott et al. | |
| 5,582,530 A | * | 12/1996 | Ady | ............................ 446/209 |
| 5,643,039 A | | 7/1997 | McIntyre | |
| 5,885,126 A | * | 3/1999 | Carlson | ...................... 446/208 |
| 5,975,978 A | | 11/1999 | Hall | |
| 6,039,627 A | * | 3/2000 | Forbes et al. | ................ 446/208 |
| 6,053,794 A | | 4/2000 | Weiser | |
| 6,083,075 A | | 7/2000 | Meeks | |
| 6,106,357 A | | 8/2000 | Weiser | |
| 6,471,563 B1 | * | 10/2002 | Carlton | ........................ 446/202 |
| 6,612,894 B1 | * | 9/2003 | Carlton | ........................ 446/202 |

* cited by examiner

*Primary Examiner*—Faye Francis
(74) *Attorney, Agent, or Firm*—Elman Technology Law, P.C.; Gerry J. Elman

(57) ABSTRACT

An apparatus for calling deer, and methods of its use; the apparatus having an adjustable sliding element moved longitudinally by the user to adjust the dimension x of a vibrating reed to vary the sound generated by the deer call. The device includes a barrel assembly with a vibrating reed mounted therein on a reed holder. A metal slider mounted for longitudinal movement within the barrel assembly has a tab extending outwardly therefrom so as to be adjustable without disassembly of the device.

12 Claims, 3 Drawing Sheets

ADJUSTABLE-TONE DEER CALL HAVING A METAL SLIDER

BACKGROUND

This invention relates to a device and method for calling wildlife and, more particularly, to a device which emulates a variety of sounds produced by deer.

Deer hunters typically employ a number of methods for calling a deer within range to be shot by a rifle, bow, or other weapon. Typically, the sounds are produced by calls having a reed placed within a longitudinal passage. The hunter forces air from the hunter's lungs through the passage and the reed vibrates to produce a tone emulating a deer sound.

SUMMARY

A deer call in accordance with the disclosed invention comprises a barrel assembly with a reed positioned within it. When a user forces air from the inlet end of the barrel assembly, air passes over and vibrates the reed, and an animal sound is simulated. Alternatively air may be passed through the deer call by the user drawing air from the distal end of the barrel assembly. The air may be drawn by placing the user's mouth at the outlet end of the barrel assembly and inhaling. Axial movement (by which is meant herein "movement along an axis") of a tone-adjusting metal slider along the axis of the reed allows the user to vary the tone of the sound produced by the call, that is, its pitch. Thus the animal sound can be made without any particular skills associated with playing musical instruments.

The present invention provides a deer call having a metal slider, e.g. of brass, which is adjusted longitudinally by means of an upstanding tab extending outside of the barrel assembly. This permits the user to change the pitch by moving a contact point where the metal slider clamps the reed. The metal slider is desirably adapted to be clamped against the reed at any of an infinite number of locations. Axially moving the metal slider results in a change in the clamping position on the reed, thus changing pitch. Additionally, a removable extension hose, optionally provided at an end opposite the mouthpiece end of the barrel assembly, can be used to increase sound volume as by resonance and is typically constructed to be expanded or contracted in an accordion-like manner, as a bellows.

The present invention provides a deer call that produces a variety of deer sounds by clamping the base of the reed to vary the dimension x and thereby the sound produced by the call.

The present invention provides a deer call that produces the full continuum of varying sounds produced by male and female deer by clamping the base of the reed to vary the length of the vibrating portion of the reed (the length sometimes being referred to herein as "dimension x"). When dimension x is shortened, the sound produced by the call has a tone of a higher frequency than before. The adjustable-tone call allows the user to quickly and accurately switch among a variety of different sounds produced by a deer.

The deer call may further comprise a lanyard, secured around the barrel assembly, for hanging the call from the user's neck. The lanyard may have a coil spring extending perpendicularly of the barrel and holding together a pair of strands of the lanyard which are then compressed by a clamp, thereby facilitating quick use of the deer call.

These and other related objects, advantages and features of this invention will become apparent upon review of the following specification in conjunction with the drawings.

BRIEF DESCRIPTION OF THE DRAWINGS

The features of the invention noted above are explained in more detail with reference to the embodiments illustrated in the attached drawing figures, in which like reference numerals denote like elements, and in which.

DETAILED DESCRIPTION

Figure 1:
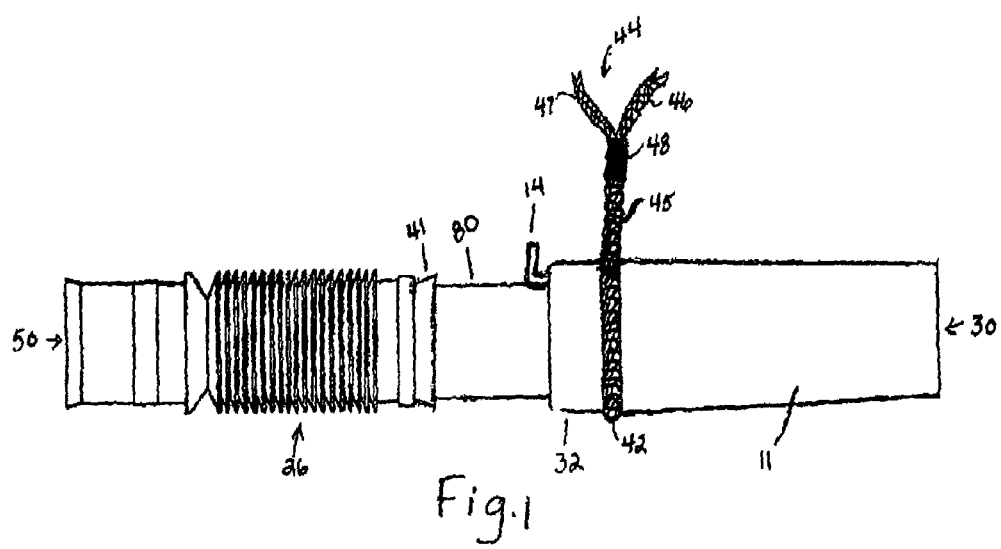
FIG. 1 is a side view of an adjustable-tone deer call as disclosed herein, complete with lanyard.

Referring to the drawings in greater detail, and initially to FIGS. 1–4, an adjustable-tone deer call is shown. The call comprises a barrel assembly, comprising an outside barrel 11 forming a mouthpiece. The inlet end 30 of the outside barrel 11 is adapted for being blown into. The barrel 11 is preferably tapered so that the inlet end 30 has a smaller diameter than the outlet end 32.

A reed 20 is supported at its proximal end by a reed holder 21, its proximal end being free to vibrate when the user blows into the inlet end 30, while manually moving the upstanding movable tab 14 extending outside of the call to engage the metal slider 16, a longitudinally-slidable element. Sound generated by such vibration comes out of the distal opening 50 of a removable extension hose 26, which extends from a small inside barrel 24 into which the reed 20 and reed holder 21 are supported by a wedge 22. The removable extension hose 26 can be used to increase sound volume as by resonance and is typically constructed to be expanded or contracted, as a bellows, accordion-like. The extension hose 26 is fitted over the distal end of the small inside barrel 24 at extension hose's axial opening 41.

Figure 3:
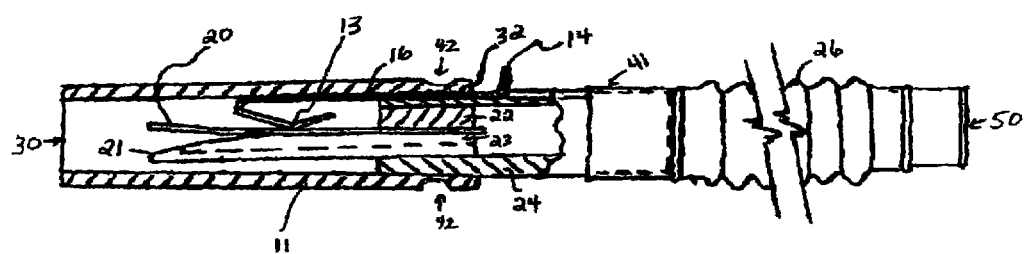
FIG. 3 is a side view of an adjustable-tone deer call as disclosed herein, a portion being shown in cross-section, and a portion of the removable extension hose being broken away for ease of illustration on the page.
Figure 4:
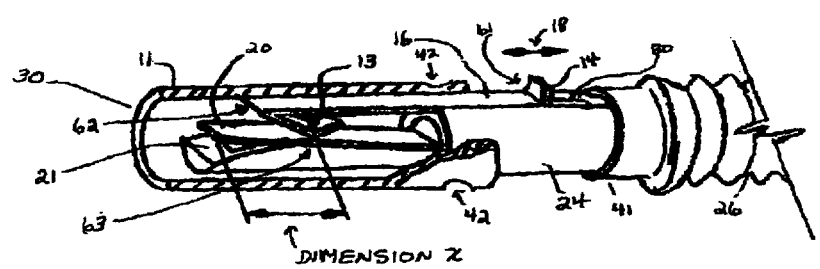
FIG. 4 is another perspective view of the barrel end of the deer call, a portion of the barrel being cut away to illustrate the insides thereof.

As shown in FIGS. 3 and 4, the adjustable-tone deer call includes a metal slider 16, which includes an upstanding movable tab 14 which extends outside of the outside barrel 11 between said outside barrel's outlet end 32 of the barrel and the small inside barrel 24 which is force-fit or otherwise frictionally secured such as by interference at its proximal end into the outside barrel 11. The user easily adjusts the metal slider 16 in its position over the reed 20 by sliding the upstanding movable tab 14 in the direction represented by two-headed arrow 18 shown in FIG. 4. This causes change in the pitch by moving a contact point 13 where a fold in the metal slider 16 clamps the reed 20 to the reed holder 21. A wedge 22 holds the reed 20 in position in cooperation with the reed holder 21. A channel 23 within the reed holder 21 permits the passage of air from the inlet end 30 of the outside barrel 11 through to the outlet end 32 of the barrel 11 and through the small inside barrel 24, into the removable extension hose 26 and out its distal opening 50.

Desirably, the tone-adjusting metal slider 16 is formed by folding a strip of springy metal in three places, as seen most clearly in FIGS. 3 and 4. A first right-angle fold 61 forms the upstanding movable tab 14, which is user-graspable to adjust pitch by sliding the element 16 longitudinally in the direction of the arrow 18. A second fold 62, preferably at an acute angle, forms the beginning of a subelement of the metal slider 16 which constitutes the contact point 13. A third fold 63, preferably at an obtuse angle, generates the line of contact for contact point 13 whereby the metal slider 16 clamps the reed 20 to the reed holder 21 to allow vibration of the reed 20 to occur along the selected dimension x as shown in FIG. 4.

When the upstanding movable tab 14 is moved axially away from the user, dimension x increases and the pitch generated by blowing into the deer call gets lower. When the upstanding movable tab 14 is moved toward the user, dimension x decreases and the pitch gets higher.

Desirably, the small inside barrel 24 has formed at the top thereof, a guide channel 80 through which the metal slider 16 is contained and its movement constrained to the direction indicated by arrow 18, from the outlet end of the outside barrel 11 to the axial end 41 of the removable extension hose 26.

In this manner, the present invention provides an adjustable-tone deer call which may be fabricated quite efficiently.

Although for clarity of illustration in FIGS. 3 and 4 of the other features, a lanyard is omitted, it is to be understood that the lanyard configuration shown in FIG. 1 is optionally, and desirably, employed in connection with the version of the invention shown in FIGS. 3 and 4.

As shown in FIGS. 1, 3 and 4, the outside barrel 11 is desirably provided with a circular indentation 42 for securing a generally circular lanyard 44 therearound. The lanyard may be made of woven material like a shoestring. A coil spring 45 that is generally perpendicular to the axis of the outside barrel 11 contains and holds together the two branches 46 and 47 of the lanyard 44 for approximately 3 cm., being slightly compressed by a clamp 48, desirably of metal. This keeps the lanyard out of the way of the user's hands and facilitates quick use of the deer call. The lanyard may be of any convenient overall length, such that the doubled-up lanyard extends for approximately 0.5 meter from the outside barrel 11 to facilitate carrying around the users neck.

Figure 2:
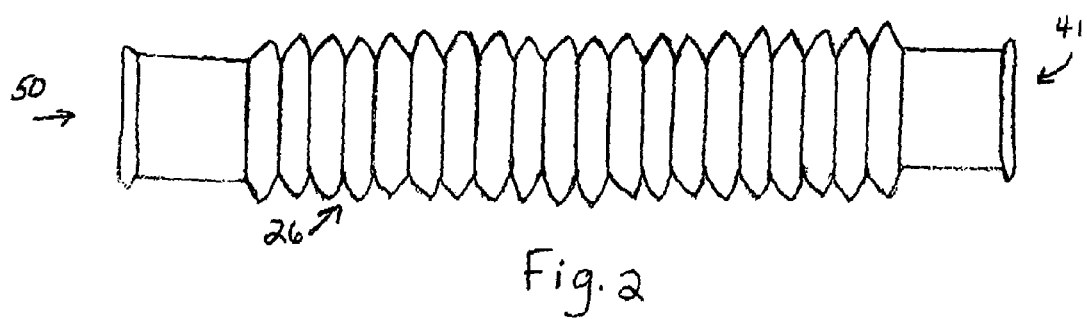
FIG. 2 is a diagrammatic side view of a removable extension hose as used in the present invention.

In a preferred embodiment, the outside barrel 11 and small inside barrel 24 are made from a solid plastic material and frictionally secured such as by an interference fit to one another. Similarly the reed 20, reed holder 21, and wedge 22 are desirably of plastic and frictionally secured such as by an interference fit to one another. As shown separately in FIG. 2, the removable extension hose 26 is desirably made from a flexible or rubbery plastic and may be frictionally or otherwise secured around the distal end of the inside barrel 24 at the axial end of the removable extension hose 41, and may be extended (as shown in FIG. 2) or cotracted (as shown in FIG. 1 for example), accordion-like, to produce a desired resonance.

The reed 20 is preferably formed from a thin plastic material, e.g. MYLAR. A solid wedge 22, typically of semi-circular cross-section, is placed within the small inside barrel 24 in abutment therewith and with the reed 20. The reed holder 21 complements the shape of the wedge 22 within the inside barrel 24 so as to clamp the base of the reed 20 extending therefrom towards the inlet end 30. A channel 23 extends through the reed holder 21, permitting air to be blown therethrough as the reed 20 is caused to vibrate creating a sound.

Figure 5:
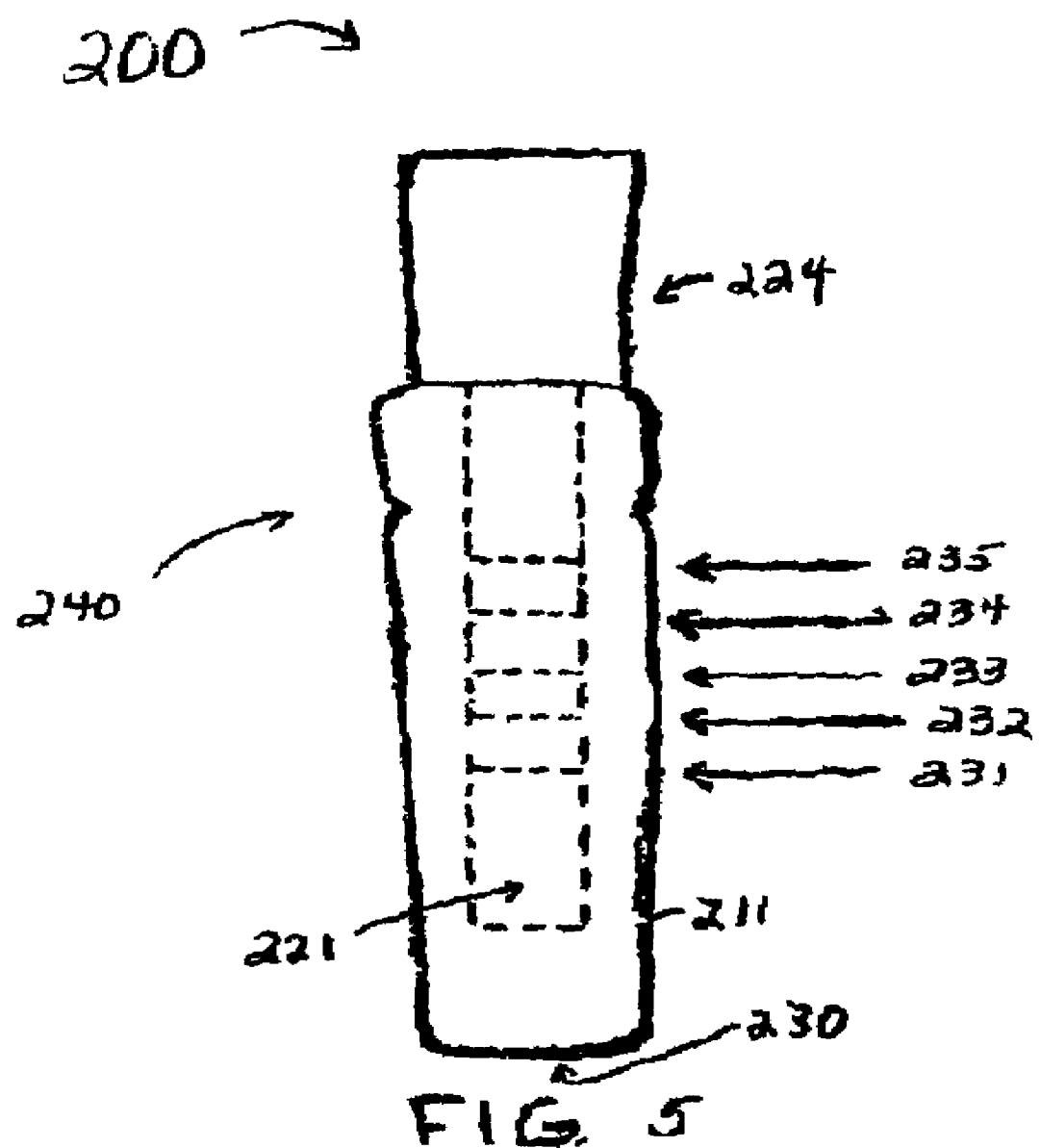
FIG. 5 is a fragmentary top plan view of an adjustable-tone deer call as disclosed herein, wherein the longitudinally-slidable element has been removed and the locations of positions for setting the contact point on the reed for various calls are marked for illustration.

FIG. 5 illustrates the range of sound of the adjustable-tone deer call as generally depicted in any of the other figures herein. For clarity of illustration, the metal slider is omitted from this view. As shown in FIG. 5, the variable positions of the contact point on the reed when the metal slider is moved permit the device to simulate various different sounds, such as a high-pitched fawn bleat (position 231), a doe bawl (position 232), a tending grunt (position 233), tail grunt (position 234), or a rutting grunt (position 235), or any variation in between. Various routines involving the use of different types, durations, and inflections of sounds are known to lure deer. These routines are easy to learn and reproduce by using the call of the present invention. The metal slider is particularly effective for switching from one call sound to another, and is capable of producing any number of call sounds.

From the foregoing it will be seen that this invention is one well adapted to attain the features and advantages hereinabove set forth together with the other advantages which are obvious and which are inherent to the structure. It will be understood that certain features and subcombinations are of utility and may be employed without reference to other features and subcombinations.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. An adjustable-tone deer call device comprising:
a barrel assembly comprising an outside barrel and a small inside barrel, the outside barrel having an inlet end adapted to serve as a mouthpiece, and having an outlet end for air, and the small inside barrel having an open proximal end secured inside the outlet end of said outside barrel and a distal end for air to exit;
a reed mounted for vibration within said barrel assembly, said reed having a proximal tree end toward the inlet end of said outside barrel, the reed generating a sound of a selected pitch when air passes through the small inside barrel;
a reed holder supporting the reed at its distal end within said barrel assembly, and having sidewalls and a bottom, together forming along with the reed, an elongated air flow channel; and
a metal slider mounted for longitudinal movement within said outside barrel and atop the small inside barrel, the slider being adapted to clamp the reed at a line of contact to the reed holder at a range of positions selectable by axially sliding the metal slider, thereby confining the length of the vibrating reed to a predetermined dimension and producing sound of a selected pitch; wherein the metal slider is a strip of metal having at least the following folds;
a first fold forming a user-erasable upstanding movable tab, the movable tab extending outside of the outside barrel;
a second fold at an acute angle forming the beginning of said metal slider; and
a third fold which defines the line of contact with the reed.

2. The deer call device of claim 1 wherein the metal slider is of brass.

3. The deer call device of claim 1, further comprising an extension hose adapted to be expanded and contracted and having a first end and a second end, the first end being removably secured in communication with the distal end of the small inside barrel, whereby the sound may be adjusted by expanding or contracting the extension hose for desired resonance.

4. The deer call device of claim 1 wherein said metal slider is adapted to be clamped against said reed at any of an infinite number of locations, producing any of an infinite number of sound pitches within a range.

5. The deer call device of claim 1 further comprising a lanyard secured to the barrel assembly.

6. A method for a user to generate sounds similar to sounds of a deer, comprising the steps of:

providing a deer call of claim 1, manually moving the tone-adjusting metal slider to set the position of the line of contact with the reed that adjusts the vibrating length of the reed to produce a sound of a desired pitch and;

passing air through the deer call, whereby said reed vibrates and creates a sound of the desired pitch.

7. The method of claim 6, wherein the step of passing air through the deer call is performed by the user forcing air into the inlet end of the barrel assembly.

8. The method of claim 6, wherein the step of passing air through the deer call is performed by the user drawing air from the distal end of the barrel assembly.

9. The method of claim 8, wherein the air is drawn by placing the user's mouth at the outlet end of the barrel assembly and inhaling.

10. A method for a user to generate sounds similar to sounds of deer, comprising the steps of:

providing a deer call device of claim 3;

manually moving the metal slider to the position that adjusts the vibrating length of the reed to produce a sound of a desired pitch;

adjusting the extension hose to provide a desired amount of resonance; and forcing air through the inlet end of the barrel assembly, whereby the reed vibrates and emits a sound of the desired pitch.

11. A method for a user to generate sounds similar to sounds of deer, comprising the steps of:

providing a deer call device of claim 3;

manually moving the metal slider to the position that adjusts the vibrating length of the reed to produce a sound of a desired pitch;

adjusting the extension hose to provide a desired amount of resonance; and drawing air from the distal end of the barrel assembly, whereby the reed vibrates and emits a sound of the desired pitch.

12. The method of claim 11, wherein the desired pitch is that of a high-pitched fawn bleat, a doe bawl, a tending grunt, a trail grunt, or a rutting grunt.

* * * * *

UNITED STATES PATENT AND TRADEMARK OFFICE
CERTIFICATE OF CORRECTION

PATENT NO. : 7,070,473 B1 Page 1 of 1
APPLICATION NO. : 10/781172
DATED : July 4, 2006
INVENTOR(S) : Cassette It is certified that error appears in the above-identified patent and that said Letters Patent is hereby corrected as shown below:

Column 4
Line 55, "user-erasable" should read -- user-graspable --

Signed and Sealed this

Nineteenth Day of December, 2006

JON W. DUDAS
*Director of the United States Patent and Trademark Office*